(12) United States Patent
Sweazey

(10) Patent No.: US 8,539,240 B2
(45) Date of Patent: Sep. 17, 2013

(54) RIGHTS OBJECT AUTHENTICATION IN ANCHOR POINT-BASED DIGITAL RIGHTS MANAGEMENT

(75) Inventor: Paul Marvin Sweazey, Lyons, CO (US)

(73) Assignee: Seagate Technology LLC, Cupertino, CA (US)

(*) Notice: Subject to any disclaimer, the term of this patent is extended or adjusted under 35 U.S.C. 154(b) by 1028 days.

(21) Appl. No.: 12/360,806

(22) Filed: Jan. 27, 2009

(65) Prior Publication Data

US 2009/0193257 A1 Jul. 30, 2009

Related U.S. Application Data

(60) Provisional application No. 61/024,174, filed on Jan. 28, 2008.

(51) Int. Cl.
*H04L 9/32* (2006.01)

(52) U.S. Cl.
USPC ............. 713/176; 713/175; 380/284; 380/44

(58) Field of Classification Search
USPC ............................ 713/176, 175; 380/44, 284
See application file for complete search history.

(56) References Cited

U.S. PATENT DOCUMENTS

| | | | |
|---|---|---|---|
| 7,577,999 B2 * | 8/2009 | Narin et al. | 726/27 |
| 7,706,540 B2 * | 4/2010 | Fransdonk | 380/279 |
| 2004/0054920 A1 * | 3/2004 | Wilson et al. | 713/200 |
| 2005/0039022 A1 * | 2/2005 | Venkatesan et al. | 713/176 |
| 2005/0138357 A1 * | 6/2005 | Swenson et al. | 713/155 |
| 2006/0282899 A1 * | 12/2006 | Raciborski | 726/26 |
| 2008/0126801 A1 * | 5/2008 | Lee et al. | 713/167 |
| 2009/0016533 A1 * | 1/2009 | Jung et al. | 380/277 |

* cited by examiner

*Primary Examiner* — Amare F Tabor
(74) *Attorney, Agent, or Firm* — Cesari & Reed, LLP; Kirk A Cesari; Christian W. Best

(57) ABSTRACT

Digital lights management (DRM) can be effectively implemented through use of an anchor point and binding records in a user domain. Furthermore, authentication of a rights object defining the scope of access allowed for a digital property instance may be achieved through use of a signing key in the anchor point. The signing key may be used to assure no tampering has occurred with the rights object since acquisition of a digital property instance. A digital property owner may gain additional functionality and control through implementation of a play counter, rental duration limit, etc., using a signing key.

18 Claims, 6 Drawing Sheets

RIGHTS OBJECT AUTHENTICATION IN ANCHOR POINT-BASED DIGITAL RIGHTS MANAGEMENT

CROSS REFERENCE

This application claims priority to U.S. Provisional Patent Application No. 61/024,174, entitled ANCHOR POINT-BASED DIGITAL RIGHTS MANAGEMENT and filed on Jan. 28, 2008, which is specifically incorporated by reference for all that it discloses and teaches.

BACKGROUND

Digital property is an evolving economic and legal concept that challenges modern technological and legal frameworks. Generally, digital property refers to any digital data that has some manner of ownership attached to it, for example, through copyright protection, trade secret protection, etc. In a typical copyright scenario, copyrights in an original work of authorship (e.g., a photograph) may be attributed to the author (e.g., the photographer). Furthermore, the work may be embodied in the form of digital data (e.g., a digital image file), the copying, distribution, derivation, etc. of which are exclusively within the rights of the author. Accordingly, each instance of the digital data (e.g., each copy of the digital image file) is an instance of the digital property of that author.

The exclusive rights associated with digital property may be transferred (e.g., assigned to another) or licensed for use by others. For example, the photographer may license another party to use a digital image on the party's website, subject to certain limitations to which the parties have agreed. However, once the digital image file is transferred out of the author's control, there is substantial risk of unauthorized copying, use, modification and distribution. Accordingly, Digital Rights Management (DRM) technologies are continually being developed to facilitate the owner's technological and legal control of his or her digital property rights.

Additionally, existing DRM approaches to facilitate the owner's technological and legal control of digital property instances have proven inadequate (e.g., being subject to tampering by malicious entities), costly, invasive, and inconvenient to the licensed users and/or digital property owners (e.g., being subject to technological breakdowns, such as computer crashes, resulting in a loss of a licensed copies), thereby limiting the widespread acceptance of these approaches. In one example, the digital property owner's control of the licensed property may be compromised by a hacked digital rights management module that alters the rights object defining the granted rights or fails to enforce the granted rights without authorization from the digital property owner (e.g., a content vendor). Accordingly, digital property ownership remains exposed to violations of the owner's property rights (e.g., from copying of the digital property by others), and furthermore, consumers remain suspicious of protected digital property. These incompatible factors amplify the transactional costs associated with distributing digital content. In turn, digital property owners/publishers charge higher licensing fees to offset losses caused by digital property theft and consumers find the convenience of unauthorized digital content worth the ethical violations and possible criminal sanctions implicated by obtaining the content through theft. The cycle feeds on itself.

SUMMARY

Implementations described and claimed herein resolve the foregoing concerns by applying an enhanced "book" paradigm to digital property. The book paradigm increases the cost of unauthorized copying, distribution, etc. of digital content while increasing the convenience for a user wishing to obtain legal license to use the particular digital content. Continuing the book paradigm example, a user may purchase a book, which represents a physical object to which the licensed rights in the underlying work are attached. The user obtains certain rights to use the work embodied in the book upon the purchase and to move the book between different locations. By binding the rights to a physical object like the book, the copyright owner dramatically increases the difficulty to a potential infringer wishing to violate the copyright owner's retained rights. That is, generally, the embodiment of the property in the physical form of the book substantially limits use of the property to those contemplated under the license transferred to the user upon purchase of the book (i.e., to the physical possessor of the book).

By comparison, the technology described herein binds the transferred rights to a secure, unique, hard-to-falsify physical object (called an "anchor point"). In one implementation, an anchor point is embodied in a highly secure, robust circuit device. The rights are secured in association with the physical anchor point (e.g., the computing or storage device in which the anchor point resides) rather than any individual instance of the digital property—the rights are bound to a binding record maintained by the physical secure anchor point device.

The logical scope or "domain" in which an anchor point controls access to digital content is called the "anchor point domain". Absent the physical anchor point (e.g., outside of the anchor point domain), the digital property is unusable. Additionally, a rights object associated with a digital property instance may be authenticated through use of a signing key associated with the anchor point. In this manner, the anchor point can confirm that the rights object later presented with the digital property instance defines the same rights originally provided by the content provider. Furthermore, traditional and future DRM approaches may be applied within an anchor point domain to manage the specific rights available, but the rights to use the digital property cannot easily leak outside the anchor point domain. Accordingly, the difficulty in mass digital property theft increases dramatically, which may encourage digital property publishers to lower prices.

In one implementation, the instance of the digital property is typically an encrypted digital data file, object, or stream. Given the appropriate encryption key, a content handler (e.g., a media player) can gain access to the digital property instance and present (e.g., play) it to a user within the rights granted in association with the anchor point. To obtain the appropriate encryption key, the content handler resides within the anchor point domain, such that it has access to the anchor point. That is, the rights are managed through and bound to the anchor point, rather than the digital property instance or some communication connection with a DRM service of the publisher, thereby increasing the convenience to the user. For example, the user may make as many copies of the digital property instance as he or she wants, but each copy is only usable if the content handler has access to the unique data managed by the anchor point to obtain the appropriate decryption key.

The unique data, herein referred to as a binding record, may be stored in a device's anchor point and may limit a user's access to digital property instances by limiting access to an associated rights object. Furthermore, a signing key may be used to encrypt the rights object and the signing key may be linked to the binding record.

In one implementation, the signing key may be used during generation of the rights object to ensure no tampering with the rights object occurs between purchase and use. In another implementation, a signing key may be used to provide additional functionality for and control over a digital property instance by allowing the anchor point to generate a new signing key after each access of the digital property instance. These implementations may or may not be used in combination within a single anchor point based digital rights management environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Digital data is inherently copy-able. Legitimate copying (i.e., under most licensing schemes) is allowable, for example, to use the digital data (e.g., copying from a hard disc into memory), to prevent loss (e.g., backing up the digital data to one or more types of storage media), to allow mobility (e.g., to transfer to a new computer, mobile device, etc.), etc. In one implementation, this continued control over a licensed digital property instance is achieved through use of a secure device referred to herein as an "anchor point." Furthermore, to provide additional security and flexibility for a digital property owner, access to the digital property can be limited through use of a signing key stored in the anchor point, wherein the signing key is used to verify that the rights object associated with the digital property instance is not compromised.

An anchor point is a highly secure circuit device that may be incorporated into a computing device, such as a computer, a mobile phone, a hard drive, a monitor, an audio player or component, a set top box, a network appliance, a personal digital assistant (PDA), a television, a digital picture frame, etc. An anchor point may be part of a local consumer device, the anchor point functionality may be provided by a remote server through an online service, etc.

Figure 1:
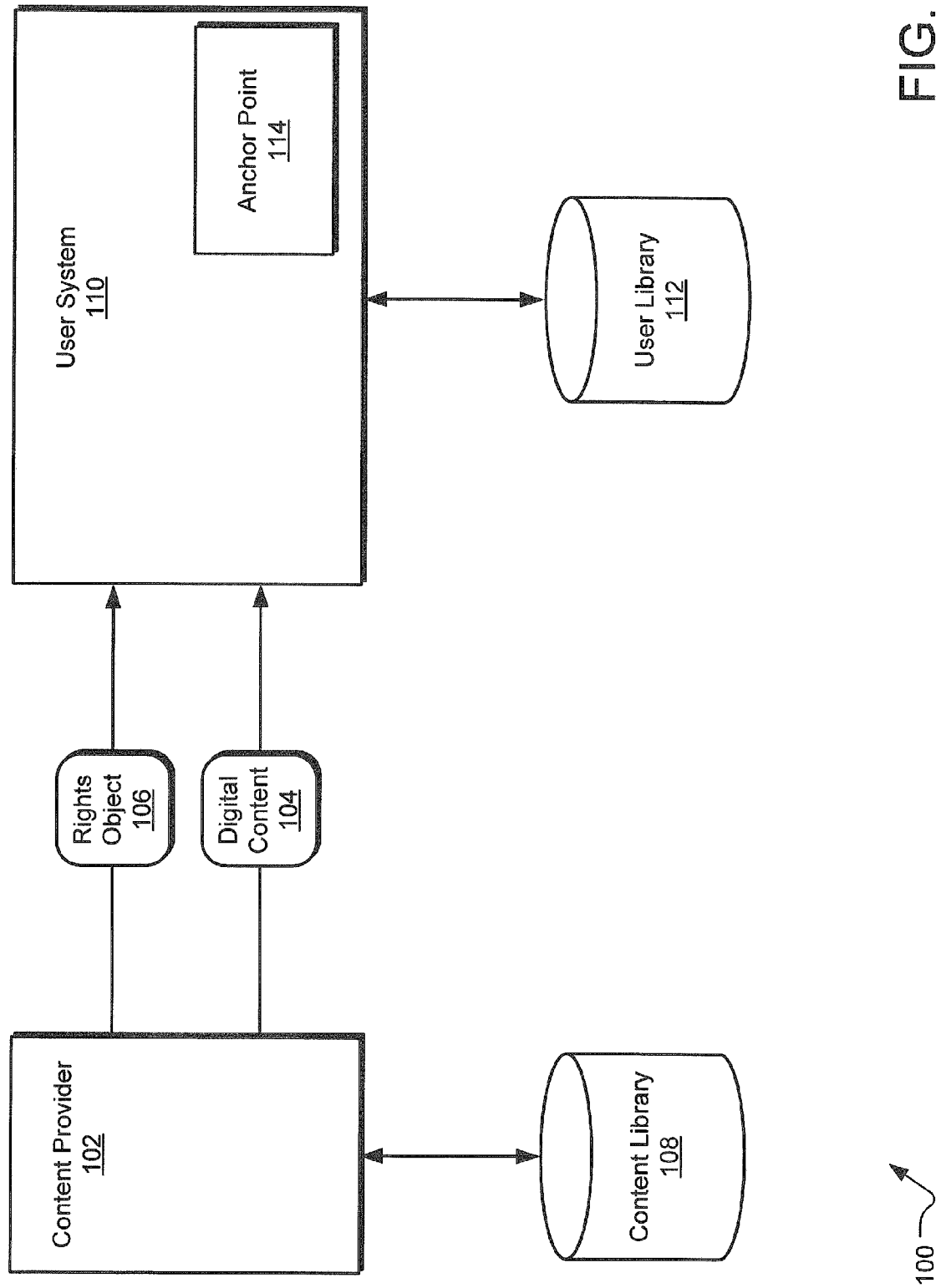
FIG. 1 illustrates an example anchor point based digital rights management environment capable of facilitating authentication of a rights object.

FIG. 1 illustrates an example anchor point based digital rights management environment 100 capable of facilitating authentication of a rights object. A content provider 102 provides digital property instances (illustrated as digital content 104) and associated rights (illustrated as rights object 106) to consumers. An example content provider 102 may include a digital music or video vendor, a digital movie rental service, etc.

In the illustrated implementation, the content provider 102 extracts the digital content 104 from a library 108, negotiates with the user on the rights provided to the user in association with the digital content 104, and transmits the digital content 104 and the rights object defining said rights to a user system 110 for storage in a user library 112 and for use by the user in accordance with the licensed rights. The user system 110 includes a secure anchor point 114 that participates in the processes of obtaining and using the digital content 104 in accordance with the licensed rights provided by the content provider 102.

Tampering or corruption of the rights object 106 presents a risk to the content provider's control of the licensed use of the digital content 104. For example, the rights object 106 may be intercepted and modified by a malicious entity in transit to the user system 110 or otherwise hacked or corrupted within the users system 110. Accordingly, the anchor point 114 cooperates with the content provider 102 to allow authentication of the rights object 106 by the anchor point 114 when the user attempts to use the digital content 104. If the anchor point 114 cannot authenticate the rights object 106, then the digital content 104 becomes unusable. Furthermore, the authentication capabilities may be moved with the digital content 104 and rights to other systems (e.g., when a user loans a digital audiobook to a friend). In this manner, the content provider 102 can be assured that the licensed rights associated with digital content 104 are not compromised, or if these rights are compromised, the digital content 104 is unusable.

Figure 2:
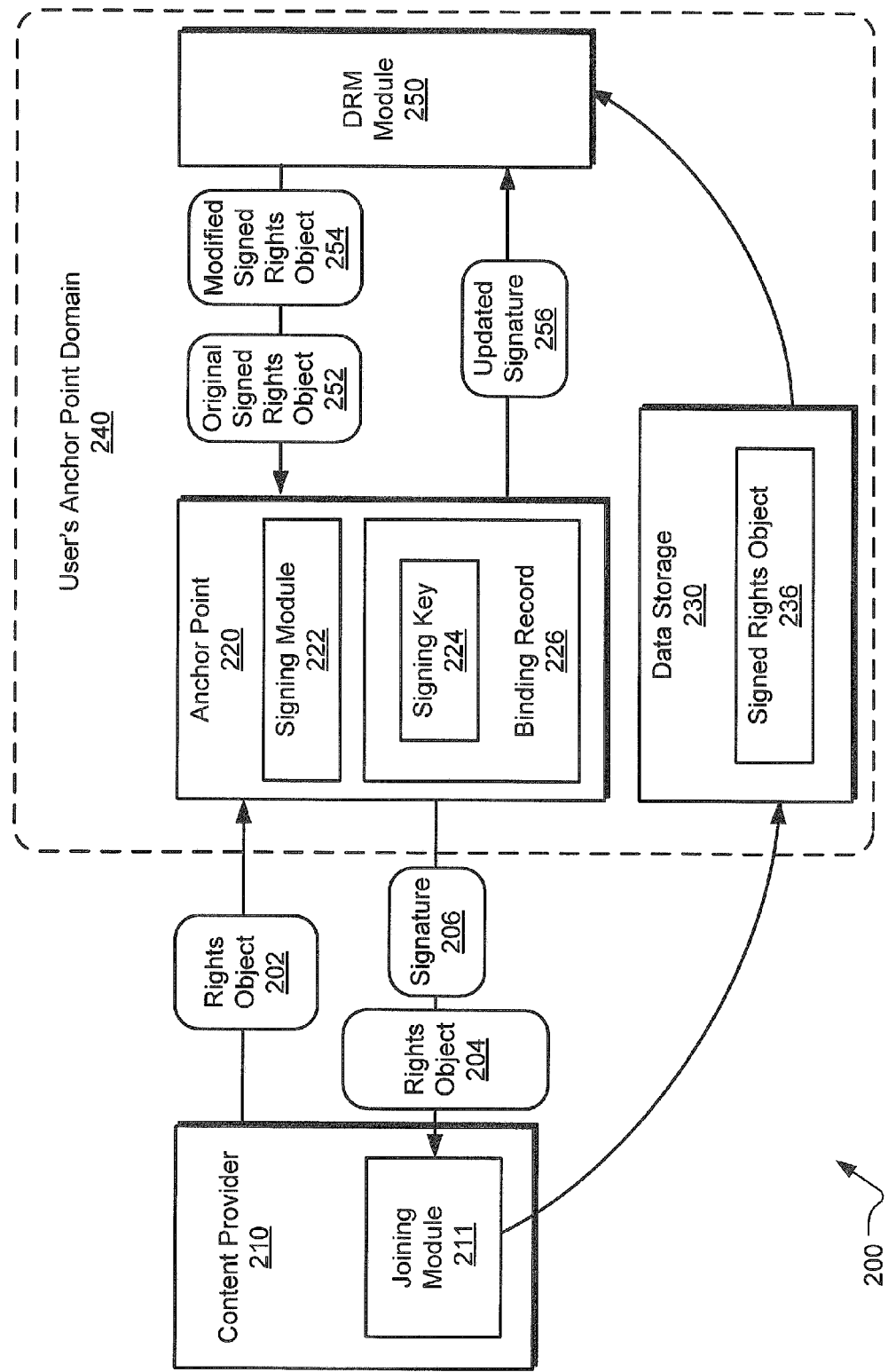
FIG. 2 illustrates a detailed example anchor point based digital rights management environment capable of facilitating authentication of a rights object.

FIG. 2 illustrates an example anchor point based digital rights management environment 200 capable of facilitating authentication of a rights object. The example anchor point based digital rights management environment 200 supports a user's online "purchase" of a digital property instance (e.g., a licensing of rights to use a digital property instance) and subsequent usage of the digital property instance by the user via his or her computer, set-top box, portable media player, etc. Connections between domains and modules may be performed over secure communications links. Generally, a secure communications link is characterized by mutual authentication using public key certificate exchange, session key agreement, and subsequent communication including symmetric encryption, although other secure communications may also be employed. In one implementation, communications are protected in one secure communications session between a user's anchor point domain 240 and a content provider 210. Additionally, some of the secure communications are exclusive between the anchor point 220 and the content provider 210 and are secured from the rest of the user's anchor point domain 240. Furthermore, communications may be performed through a communications network or a direct link. For example, the user's anchor point domain 240 may connect through a communications link directly to the content provider 210, such as by use of a USB cable or wireless connection (e.g., WiFi, BlueTooth, mobile phone technology, etc.).

In one implementation, during a "purchase" of a digital property instance, the content provider 210 provides a title pre-key to the anchor point 220 of the user's anchor point domain 240, which processes the title pre-key and returns a title key to the content provider 210. In one implementation, the content provider 210 uses the returned title key to encrypt the instance of digital property to yield the encrypted title instance, which may be transferred to the data storage 230 in the user's anchor point domain 240. In an alternative implementation, the content provider 210 creates its own title key and leaves it to the anchor point 220 to determine and return the title pre-key. The title key represents a decryption key used to decrypt the digital property instance within the user's anchor point domain 240 to allow the user to use the digital property instance.

To define the rights associated with the purchased digital property instance, the content provider 210 builds a rights object 202, in which it embeds, among other data, an encrypted version of the title pre-key called a license key. To allow the anchor point 220 to verify later that the rights object 202 has not been tampered with, the content provider 210 transmits the rights object 202 to the anchor point 220, which signs the rights object 202 using a signing key 224. In one implementation, the content provider 210 transmits the rights object 202 to the anchor point 220 for signing using a command called "makeMAC( )". In response to the makeMAC( ) command, the anchor point 220 uses a signing module 222 to randomly generate the signing key 224 that can be stored securely in the anchor point 220 with the binding record 226 for the associated digital property instance. Later, when the user attempts to use the digital property instance, an authentication module (not shown) within the anchor point 220 verifies that the rights object is the same one it signed. In this implementation, because the anchor point 220 does both the signing and checking, a MAC is appropriate because the anchor point 220, which is both the signer and the checker, knows the signing key 224. As such, the signing key 224 does not need to be shared outside of the anchor point 220 and may be stored securely with the associated binding record 226 in the anchor point 220. Notwithstanding, other authentication mechanisms may be employed.

During the initial stage of providing the digital content and rights object, the anchor point 220 returns the associated signature 206 to the content provider 210, which joins the signature 206 with the rights object 204 through a joining module 211 and transfers the combined rights object 204 and signature 206 to the data storage 230 of the user domain 240 as the signed rights object 236. In an alternative implementation, another entity, such as the anchor point 220 could join the rights object 204 and signature 206 to form the signed rights object 236. In yet another implementation, the anchor point 220 need only return the signature 206 because the content provider 210 already possesses a copy of the rights object 204 and therefore can combined the signature 206 with that copy of the rights object 204 to form the signed rights object 236.

Once a signed rights object 236 is stored in the data store 230 of a user's anchor point domain 240, a DRM module 250 can access the signed rights object 236 to extract or derive a title pre-key to be received by the anchor point 220. The DRM module 250 in the user's anchor point domain 240 uses the signed rights object 236 to determine if access to the digital property instance should be allowed in accordance with the licensing terms defined in the signed rights object 236. However, before the anchor point 220 generates a title key to decrypt digital property instance for the user's use, the DRM module 250 offers the signed rights object 236 for authentication by the anchor point 220, which attempts to authenticate the signed rights object 236 using the associated signing key 224 stored with the binding record 226 for the digital property instance. In this manner, the anchor point 220 can prevent use of the digital property instance if the rights object cannot be authenticated.

In some circumstances, the DRM module 250 may modify the signed rights object 236 to provide additional functionalities for the digital property owner, such as but not limited to, a play count limitation. For example, a changeable value in the signed rights object 236 may specify a "play count". Before use of the digital property instance is allowed, the DRM module 250 checks to see if the play count has reached a maximum value. If not, then the DRM module 250 expects to allow the use by generating the title pre-key, which it sends to the anchor point 220 for generation of the title key. However, before allowing such use, the DRM module 250 sends both an original version 252 of the signed rights object 236 and a modified version 254 of the signed rights object 236 in which the play count has been incremented. The anchor point 220 verifies the signature of the original signed rights object version 252 using signing key 224 associated with the signed rights object 252 and stored with the binding record 226 associated with the digital property instance. If the signature cannot be verified, then the anchor point 220 returns an error message and use of the digital property instance is prevented. If the signature verified, then the anchor point 220 creates a new signature 256 based on the modified rights object version 254 and returns the new signature 256 to the DRM module 250 to be saved with the modified signed rights object 254.

In one implementation, the signing key 224 used to sign the modified rights object 254 is different than the signing key 224 used to sign and check the original lights object 202. The anchor point 220 may randomly generates a new signing key 224 for each new signature.

In one implementation, even though the DRM module 250 generally tracks licensing details of licensed digital property content, the anchor point 220 can enforce rudimentary expiration triggers. In such implementations, two procedures may be exposed in the anchor point 220: GenCnt( ), to access a "signature generation counter", and ChkExpire( ), to access the "expiration timestamp." These two procedures may be pre-defined to be stored in the anchor point 220 for every rights object 202 that the anchor point 220 manages. Thus, even if the DRM module 250 is compromised, there is a limit to how many times or for how much time the rights object 202 may be usable. The vendor domain 210 may fix these values in the anchor point 220 when it submits the rights object 202 for the initial signature and the values can be maintained within the anchor point 220, with the rest of the binding record 226, so that even a compromised DRM module 250 may not tamper with them.

An example scenario showing how rights objects for "temporarily" licensed digital property can be backed up each time the rights object is changed and re-signed is presented below. The example presented is illustrative only of particular embodiments should not be construed as limiting.

Figure 3:
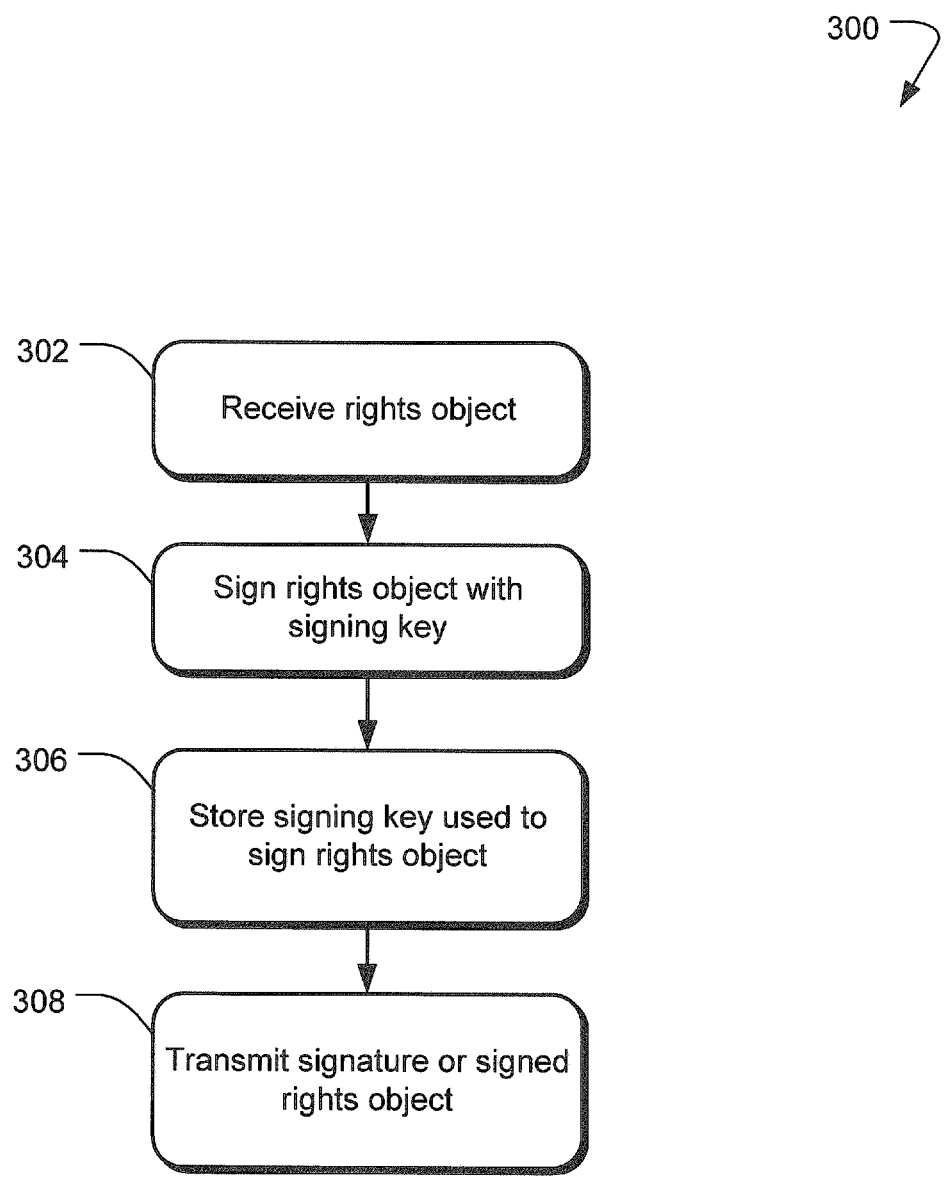
FIG. 3 illustrates example operations for generating a signature for a rights object in an anchor point based digital rights management environment.

FIG. 3 illustrates example operations for generating a signature for a rights object in an anchor point based digital rights management environment 300. A receiving operation 302 receives a rights object. For example, an anchor point may receive a rights object from a content provider, which sends the rights object associated with recently purchased digital property instance to the anchor point for a signature so the anchor point can later detect any subsequent tampering with the rights object. In an alternative implementation, a rights object is received from a DRM module by an anchor point. For example, when a DRM module is instructed to limit the number of times a user may use licensed digital property, the DRM module can transmit an original rights object and a modified rights object to the anchor point, which is expected to verify the original rights object, sign the modified rights object, and return the new signature.

In yet another implementation, the anchor point is merely expected to verify the original rights object to confirm that it has not been tampered with. If the anchor point cannot verify the rights object, then it issues an error and does not generate a title key for the digital property instance until it receives a verifiable rights object for that digital property instance. In this implementation, processing errors out and does not proceed to the signing operation 304.

A signing operation 304 signs the received rights object. In one implementation, the anchor point randomly generates a signing key to sign the rights object or uses a previously stored signing key associated with the binding record of the digital property instance, although other authentication approaches may be employed. A storing operation 306 securely stores the signing key in a binding record (e.g., of the anchor point) associated with the purchased digital property instance.

A transmitting operation 308 transmits the signature back to the content provider or the DRM module, depending on the signing scenario presented. In one implementation, the signature is transmitted to the vendor domain to be joined and then transmitted to the data storage of the user. In another implementation, the signed rights object, which had been previously modified by the DRM module, is transmitted to the DRM module, which stores it in the data storage of the user.

Figure 4:
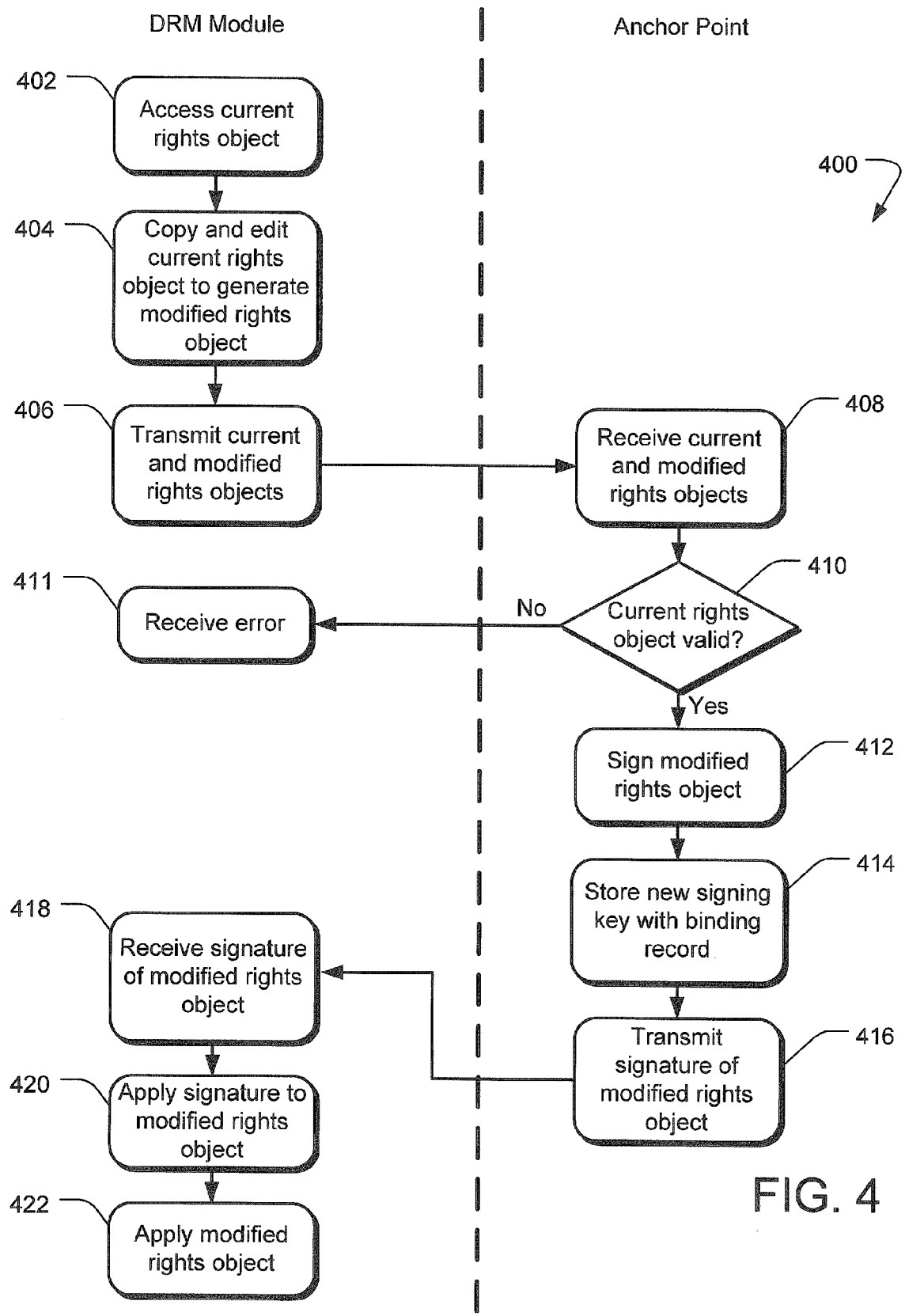
FIG. 4 illustrates example operations for authenticating and modifying a signature for a rights object in an anchor point based digital rights management environment.

FIG. 4 illustrates example operations 400 for authenticating and modifying a signature for a rights object in an anchor point based digital rights management environment. In this scenario, an anchor point and a DRM module can work together using one or more signing keys, rights objects, and associated signatures to provide additional functionality and security for a digital property owner. In one implementation, operations performed by the DRM module may be performed by other modules in a user anchor point domain, such as but not limited, to the data storage.

An access operation 402 accesses a current rights object in the user's data storage. The current rights object is typically provided by a content provider or generated by a DRM module as a modification of another previous rights object, although other intermediaries and rights providers may also be involved. For example, in one implementation, a DRM module accesses the rights object to determine the authorized use of the digital property instance that is allowed to the user, and in doing so, modifies the rights object to alter certain changeable parameters in the rights object. A generation operation 404 creates a copy of the current rights object, and the copy is modified to yield a modified rights object. In one implementation, the copied rights object is modified to indicate an incrementing in a predetermined usage limit, such as a play count. A transmission operation 406 transmits the current rights object and the modified rights object to the anchor point. Note: If no modifications are made to the rights object (i.e., the anchor point is just verifying the rights object, then operation 404 is skipped and operations 406, 408, and 410 continue, absent the modified rights object, to accomplish verification of the current rights object.

A receiving operation 408 receives the current rights object and the modified rights object at the anchor point. An authentication operation 410 checks the current rights object signature to determine if the current rights object has been tampered with since the rights object was previously acquired from the content provider or DRM module. If the authentication operation 410 cannot authenticate the current rights object and therefore determines that the current rights object has been tampered with, then an error message is returned to the DRM module or data storage at an error operation 411. In contrast, if the authentication operation 410 authenticates the current rights object, then a signing operation 412 obtains a signing key, such as by randomly generating a new signing key or via some other mechanism, and computes a new signature based on the modified rights object and the new signing key (e.g., signs the modified rights object received from the DRM module or data storage to create a new signature). The signing key used to sign the modified rights object is stored in the binding record in the anchor point at a storage operation 414. In one implementation, the signing key is stored in the anchor point with the binding record associated with the signed rights object. A transmission operation 416 passes the new signature back to the DRM module or data storage. Note: If the DRM module was merely attempting to authenticate the current rights object, then the authentication operation 410 informs the DRM module of a successful authentication and subsequent operations are skipped.

A receiving operation 418 receives the signature generated by the signing of the modified rights object at the DRM module or data storage. A joining operation 420 applies the new signature to the modified rights object. In one implementation, the modified rights object joined to the new signature replaces the original signed rights object, thereby limiting access to the associated digital property in accordance with the modified rights object, which becomes the current rights object. An application operation 422 applies the new current rights object to the digital property instance to determine how the user may use the digital property instance.

In an alternative implementation, the protocol may require that the title pre-key is presented to the anchor point with the signed rights object, such that the anchor point only computes the title key if the signed rights object is verified by the anchor point in the same operation. In this implementation, the anchor point directly enforces the requirement that content may only be used if the corresponding rights object is authenticated by the anchor point.

Figure 5:
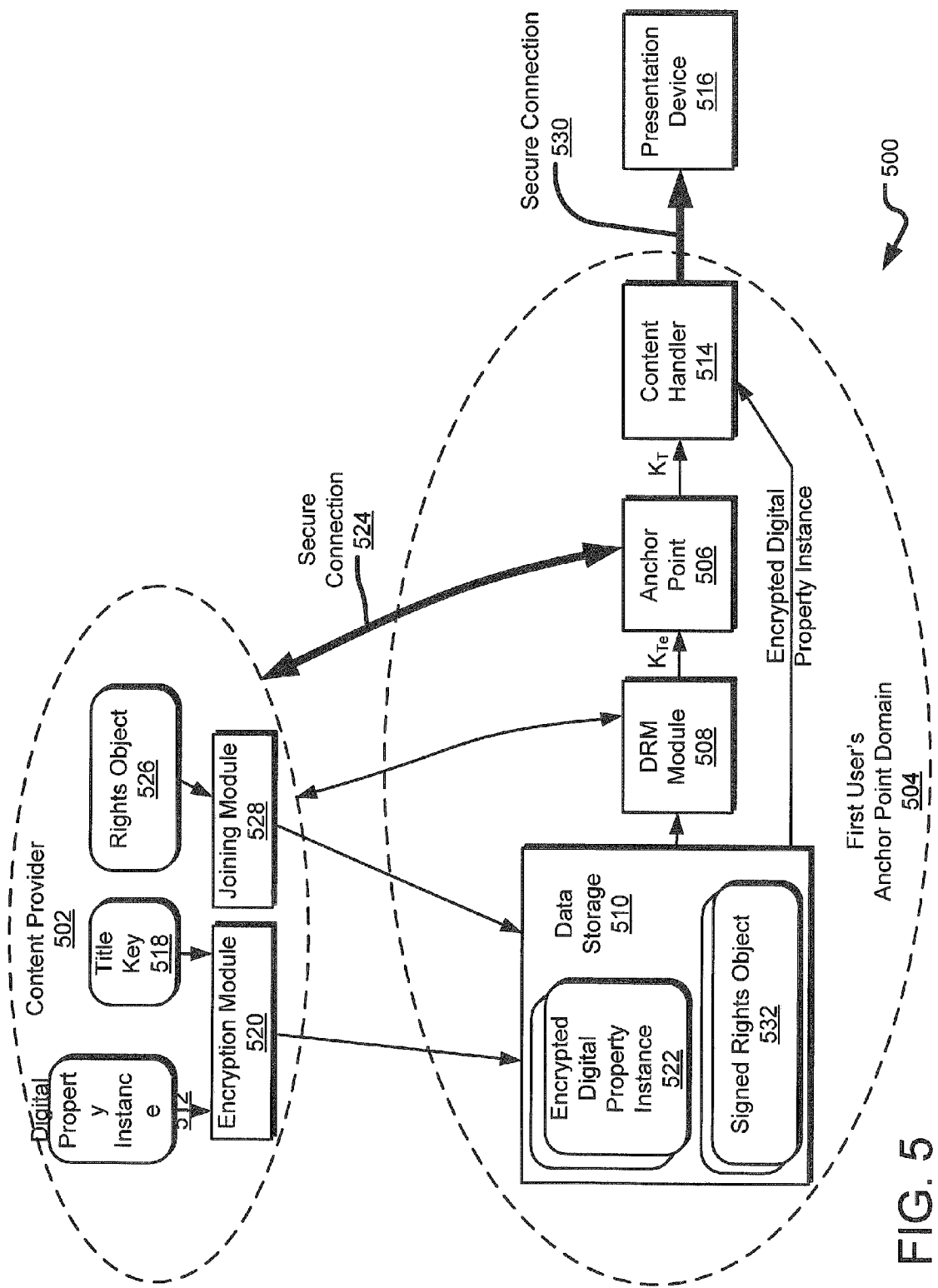
FIG. 5 illustrates an example architecture of anchor point based digital rights management environment capable of facilitating authentication of a rights object.

FIG. 5 illustrates an example architecture of anchor point based digital rights management environment 500 capable of facilitating authentication of a rights object. A content provider 502 operates in a secure environment, from which the content provider 502 can issue content in the form of digital property instances 512 (or copies). Generally, the content provider 502 interacts with a user within the user's anchor point domain 504 to provide a uniquely encrypted instance of digital property and a signed rights object 532 associated with the digital property instance to declare the licensed rights obtained by the user. Within the user's anchor point domain 504, an anchor point 506, a DRM module 508, and data storage 510 work with the content provider 502 to transfer the uniquely encrypted instance of the digital property and the signed rights object 532 to the user's anchor point domain 504. Thereafter, the content provider 502 need not be involved, although in some implementations, the content provider 502 may become involved again in the future (e.g., to obtained updates to the digital property instance, to obtain replacements of the digital property instance, etc.).

After the digital property instance and the rights object are transferred to the user's anchor point domain 504, the anchor point 506, the DRM module 508, and data storage 510 work together (without the need to contact the content provider 502) to generate a key (e.g., a title key) to allow a content handler 514 (e.g., a media player device or software module) and a presentation device 516 (e.g., a display device or sound card) to decrypt and present (e.g., play or display) the digital property instance 512 to the user.

Turning more specifically to the implementation illustrated in FIG. 5, assume the vendor receives a request from the user for specific content. The content (e.g., a digital video title) is a form of a digital property that can be embodied in a digital property instance 512 (e.g., a digital video file) from within the content provider 502. Typically, the user and content provider 502 will agree on the licensing terms of the transfer, which may represent a broad range of possible terms. For example, the user may request a 24 hour "rental" of a digital movie title or a perpetual license to play a digital audio title. A goal of the vendor is to transfer a secure instance of the requested title to the user with confidence that the user will only be able to use the title in accordance with the agreed upon terms.

In the first stage, that of transferring the digital property instance and rights object to the user's anchor point domain 504, the content provider 502 chooses a random title key 518 ($K_T$), which is generally expected to be unique among all users and transferred digital property instances, even those associated with the same content title. The content provider 502 encrypts the digital property instance 512 with the title key 518 via an encryption module 520 to yield an encrypted title instance 522, which is communicated (e.g., downloaded) to the data storage 510 in the user's anchor point domain 504 through wired networking, wireless networking, or physical means (e.g., "sneaker net").

In one implementation, the content provider 502 also contacts the user's anchor point 506 via a secure connection 524 to obtain a title pre-key. In one specific approach employed over a network, when the user initially requests the content title instance, he or she provides a URL to his or her anchor point 506. The content provider 502 uses this URL to locate the anchor point 506 over the network and to establish the secure connection 524.

The content provider 502 then sends the title key 518 to the anchor point 506 through the secure connection 524. In one implementation, the content provider 502 sends the title key 518 using a create_binding( ) function. Responsive to receipt of the create_binding( ) call, the anchor point 506 generates a binding record, including data such as a binding record identifier (ID), a binding record passkey, a binding key, one or more signing keys, an output security level, etc. The anchor point 506 encrypts the title key using the binding key (randomly generated by the anchor point 506) to yield the title pre-key ($K_{Te}$), which is returned to the content provider 502 via the secure connection 524. The anchor point 506 also sends the binding record ID and binding record passkey to the content provider 502 to be embedded in a rights object. At this point, the content provider 502 no longer needs the title key and may delete it from its storage.

The content provider 502 also requests a DRM key from the DRM module 508 in the user's anchor point domain 504. The content provider 502 uses the DRM key to encrypt the title pre-key to yield a license key. The content provider 502 has a definition of licensed rights (e.g., in an XML file) to be associated with the transferred encrypted digital property instance 522 and embeds the license key, the binding record ID, and the binding record passkey into the licensed rights definition to yield a rights object 526. Secret information, such as passkeys, may be encrypted prior to being embedded into a rights object, using some user-supplied secret, so that the user has control over who can access the licensed content.

The rights object 526 is then sent to the anchor point 506 through the secure connection 524 to be signed by one of the anchor point's signing keys (randomly generated by the anchor point 506) in order for the anchor point 506 to be able to verify that the rights object 526 has not been tampered with. In one implementation, the type of signature used is more typically called a message authentication code (MAC), although other methods may be employed. In this implementation, because the anchor point 506 does both the signing and checking, a MAC is appropriate because the anchor point 506, which is both the signer and the checker, knows the signing key. As such, the signing key does not need to be shared outside of the anchor point 506.

The anchor point's signature is then returned to the content provider 502 via the secure connection 524, joined to the rights object 526 by a joining module 528, and transferred to the data storage 510 in the user domain 504. In another implementation, the rights object and signature may be joined in the anchor point, which returns the entire signed rights object. The content provider 502 may then recede into the background, as the vendor no longer needs to be involved in the user's use of the digital property instance 522—the user's anchor point domain 504 has all it needs to use the digital property instance 522. Nevertheless, the content provider 502 may return to the scene to provide beneficial services, including updating and/or replacing digital property instances, etc.

In one specific approach using a MAC, the content provider 502 may build a rights object 526, in which it may embed the title pre-key, and pass the rights object 526 to the anchor point 506 for signing using a command called "makeMAC( )". In response, the anchor point 506 randomly generates a signing key that is stored with the binding record for the current title instance and returns the signature to the content provider 502, where the signature is joined through a joining module 528 with the rights object 526 and transferred to the data storage 510 of the user's anchor point domain 504. In another implementation, the entire signed rights object may be return by the anchor point.

In one alternative implementation, when setting up the binding, the content provider 502 generates a title pre-key, instead of a title key, and sends the title pre-key to the anchor point 506, which generates the title key and returns it to the content provider 502 for use in encrypting the digital property instance 512. In this implementation, the anchor point 506 decrypts the content provider-provided title pre-key using a binding key to obtain the title key that may be securely sent to the content provider 502 for use in encrypting the digital property instance 512. Then, during usage, when the user attempts to decrypt and present the encrypted title instance, the anchor point receives the title pre-key from the DRM module and decrypts the title pre-key using its binding key to obtain the title key.

In yet another alternative implementation, the anchor point 506 generates both the title key and the title pre-key, providing these to the content provider 502.

In a second stage, having obtained the encrypted title instance 512 and the signed rights object 532, and having generated a binding record in the anchor point 506, the user's anchor point domain 504 can re-generate a title key required to present the content to the user. In one implementation, the stream of title keys are presented to the content handler 514, which decrypts portions of the digital property instance using these keys. For example, a video file may require decryption by a new title key every 10 frames. As such, the anchor point 506 would provide a new title key every 10 frames to allow the content handler 514 to decrypt the next portion of 10 frames.

The DRM module 508 can extract the license key from the signed rights object 532 and decrypt it using the DRM module's DRM key to obtain the title pre-key. The DRM module 508 can also extracts the binding record ID and binding record passkey from the signed rights object 532. The DRM module 508 then passes the title pre-key, binding record ID, and the binding record passkey to the anchor point 506 assuming the DRM module 508 can confirm compliance with the licensed rights defined in the signed rights object 532. With the title pre-key and the binding record information, the anchor point 506 can access the appropriate binding record it is storing to re-generate the title key using its binding key (e.g., the anchor point 506 decrypts the title pre-key using the binding key to generate the title key) and can then pass the title key to the content handler 514 to allow decryption of the encrypted digital property instance 522 and presentation of the content. It should be understood that, in one implementation, the DRM module 508 passes a stream of title pre-keys to the anchor point 506 to allow the anchor point 506 to pass a stream of title keys to the content handler 514.

In yet another implementation, the anchor point may require that a properly signed rights object be submitted with the title pre-key before the anchor point will generate a title key for an associated digital property instance.

It should also be noted that the anchor point 506 may also check the signed rights object 532 to verify that the anchor point's most recent signature is contained within the signed rights object 532. This check guards against tampering with the rights object 532. Also, the anchor point 506 may re-sign the signed rights object 532 at each processing to update any changes to the licensed rights.

For example, before access to an encrypted digital title instance 522 may be allowed, the DRM module 508 may check to see if the play count has reached a maximum value yet. If not, then it expects to allow the access by generating the title pre-key and sending it to the anchor point 506. However, before allowing such access, the DRM module 508 may send the original signed rights object 532 (which was signed by the anchor point 506 previously) and also a modified version of the rights object in which the play count has been incremented. The anchor point 506 may then check the signature (i.e. the MAC) of the original signed rights object 532. If the signature is wrong, then the anchor point 506 may return an error message. If the signature checks, then the anchor point 506 may compute a new signature (i.e. a new MAC) for the modified rights object and return that signature to be saved with the new rights object.

At this point, the encrypted title instance 522 may be retrieved from data storage 510 by the content handler 514, which decrypts the encrypted digital property instance 522 using the title key to yield a digital property instance that can be presented to the user via the presentation device 516 (connected to the content handler 514 through a secure connection 530).

Figure 6:
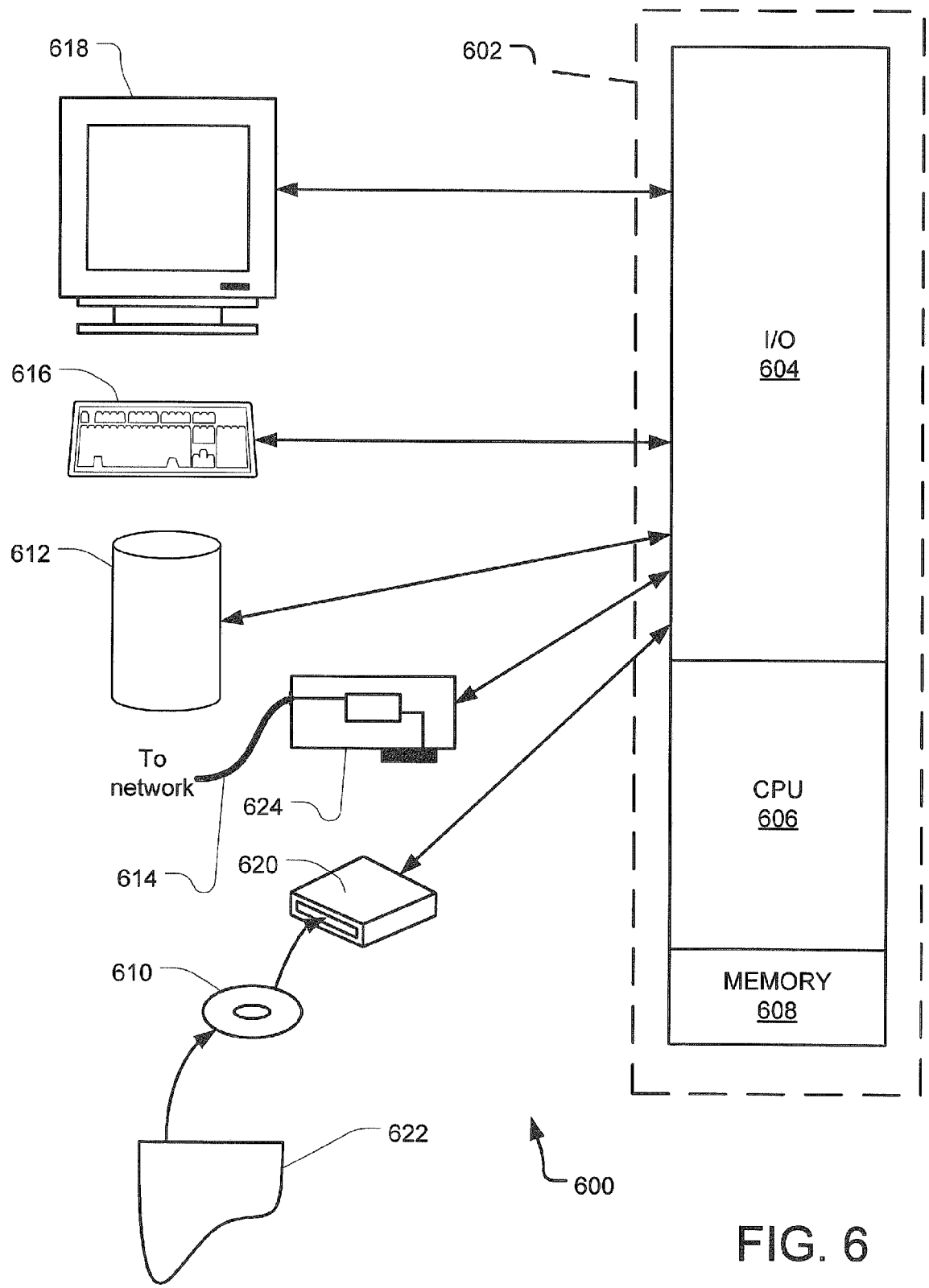
FIG. 6 illustrates an example system that may be useful in implementing the described technology.

FIG. 6 illustrates an example system that may be useful in implementing the described technology. A general purpose computer system 600 is capable of executing a computer program product to execute a computer process. Data and program files may be input to the computer system 600, which reads the files and executes the programs therein. Some of the elements of a general purpose computer system 600 are shown in FIG. 6 wherein a processor 602 is shown having an input/output (I/O) section 604, a Central Processing Unit (CPU) 606, and a memory section 608. There may be one or more processors 602, such that the processor 602 of the computer system 600 comprises a single central-processing unit 606, or a plurality of processing units, commonly referred to as a parallel processing environment. The computer system 600 may be a conventional computer, a distributed computer, or any other type of computer. The described technology is optionally implemented in software devices loaded in memory 608, stored on a configured DVD/CD-ROM 610 or storage unit 612, and/or communicated via a wired or wireless network link 614 on a carrier signal, thereby transforming the computer system 600 in FIG. 6 to a special purpose machine for implementing the described operations.

The I/O section 604 is connected to one or more user-interface devices (e.g., a keyboard 616 and a display unit 618), a disk storage unit 612, and a disk drive unit 620. Generally, in contemporary systems, the disk drive unit 620 is a DVD/CD-ROM drive unit capable of reading the DVD/CD-ROM medium 610, which typically contains programs and data 622. Computer program products containing mechanisms to effectuate the systems and methods in accordance with the described technology may reside in the memory section 608, on a disk storage unit 612, or on the DVD/CD-ROM medium 610 of such a system 600. Alternatively, a disk drive unit 620 may be replaced or supplemented by a floppy drive unit, a tape drive unit, or other storage medium drive unit. The network adapter 624 is capable of connecting the computer system to a network via the network link 614, through which the computer system can receive instructions and data embodied in a carrier wave. Examples of such systems include SPARC systems offered by Sun Microsystems, Inc., personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are exemplary and other means of and communications devices for establishing a communications link between the computers may be used.

In an example implementation, anchor points, DRM modules, content handlers, and other modules may be incorporated as part of the operating system, application programs, or other program modules or hardware components. Orders logs, products databases, user databases, order code databases, transaction logs, and other data may be stored as program data.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements or tamper-resistance of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts described above. Rather, the specific features and acts described above are disclosed as example forms of implementing the claimed subject matter.

What is claimed is:

1. A method comprising:
   authenticating a rights object using a secure anchor point device, the secure anchor point comprising a secure, unique, hard-to-falsify circuit, the rights object being provided by a content provider and defining one or more rights to use an encrypted digital property instance, the authenticating including:
      generating in the secure anchor point device a signature based on a signing key;
      transmitting the signature from the secure anchor point device to the content provider;
      receiving in the secure anchor point device a signed rights object from a digital rights management module, the signed rights object including the rights object and the signature, responsive to transmitting the signature to the content provider; and
      receiving a title pre-key when use of the encrypted digital property is in accordance with the one or more rights defined in the signed rights object;
      verifying the signed rights object in the secure anchor point device using the signing key.

2. The method of claim 1 further comprising:
   receiving in the secure anchor point device from the digital rights management module a title pre-key associated with the signed rights object and the encrypted digital property instance;
   generating in the secure anchor point device a title key based on the received title pre-key, the title key being usable to decrypt the encrypted digital property instance, if the verifying operation authenticates the signed rights object.

3. The method of claim 1 wherein the receiving operation comprises receiving in the secure anchor point device a combination of the signed rights object and a title pre-key from the digital rights management module, and further comprising:
   generating based on the title pre-key a title key usable to decrypt the encrypted digital property instance in the secure anchor point device, if the verifying operation authenticates the signed rights object.

4. The method of claim 1 further comprising:
   securely storing the signing key in the secure anchor point device.

5. The method of claim 1 further comprising:
   securely storing the signing key in the secure anchor point device in association with a binding record corresponding to the encrypted digital property instance, the binding record containing a binding key that decrypts a title pre-key received from the digital rights management module to generate a title key usable to decrypt the encrypted digital property instance.

6. The method of claim 1 further comprising:
   receiving in the secure anchor point device the signed rights object and a modified rights object;
   verifying in the secure anchor point device the signed rights object using the signing key;
   generating in the secure anchor point device a new signature based on a new signing key and the modified rights object;
   transmitting the new signature from the secure anchor point device to the content provider.

7. The method of claim 6 further comprising:
   securely storing the signing key in the secure anchor point device, prior to receiving the signed rights object and a modified rights object;
   replacing the signing key in the secure anchor point device with the new signing key used to generate the new signature.

8. The method of claim 6 further comprising:
   securely storing the signing key in the secure anchor point device in association with a binding record corresponding to the encrypted digital property instance, the binding record containing a binding key that decrypts a title pre-key received from the digital rights management module to generate a title key usable to decrypt the encrypted digital property instance;
   replacing the signing key in the binding record of the secure anchor point device with the new signing key used to generate the new signature.

9. A computer-readable storage device storing instructions, that when executed by a processor cause the processor to perform a method comprising:
   authenticating a rights object using a secure anchor point device, the secure anchor point comprising a secure, unique, hard-to-falsify circuit, the rights object being provided by a content provider and defining one or more rights to use an encrypted digital property instance, the authenticating including:
      generating in the secure anchor point device a signature based on a signing;
      transmitting the signature from the secure anchor point device to the content provider;
      receiving in the secure anchor point device a signed rights object from a digital rights management module, the signed rights object including the rights object and the signature, responsive to transmitting the signature to the content provider; and
      receiving a title pre-key when use of the encrypted digital property is in accordance with the one or more rights defined in the signed rights object;
      verifying the signed rights object in the secure anchor point device using the signing key.

10. The computer-readable storage device of claim 9 wherein the method further comprises:
   receiving in the secure anchor point device from the digital rights management module a title pre-key associated with the signed rights object and the encrypted digital property instance;
   generating in the secure anchor point device a title key based on the received title pre-key, the title key being usable to decrypt the encrypted digital property instance, if the verifying operation authenticates the signed rights object.

11. The computer-readable storage device of claim 9 wherein the receiving operation comprises receiving in the secure anchor point device a combination of the signed rights object and a title pre-key from the digital rights management module, and further comprising:

generating based on the title pre-key a title key usable to decrypt the encrypted digital property instance in the secure anchor point device, if the verifying operation authenticates the signed rights object.

12. The computer-readable storage device of claim 9 wherein the method further comprises:

securely storing the signing key in the secure anchor point device.

13. The computer-readable storage device of claim 9 wherein the method further comprises:

securely storing the signing key in the secure anchor point device in association with a binding record corresponding to the encrypted digital property instance, the binding record containing a binding key that decrypts a title pre-key received from the digital rights management module to generate a title key usable to decrypt the encrypted digital property instance.

14. The computer-readable storage device of claim 9 wherein the method further comprises:

receiving in the secure anchor point device the signed rights object and a modified rights object;

verifying in the secure anchor point device the signed rights object using the signing key;

generating in the secure anchor point device a new signature based on a new signing key and the modified rights object;

transmitting the new signature from the secure anchor point device to the content provider.

15. The computer-readable storage device of claim 9 wherein the method further comprises:

securely storing the signing key in the secure anchor point device, prior to receiving the signed rights object and a modified rights object;

replacing the signing key in the secure anchor point device with the new signing key used to generate the new signature.

16. The computer-readable storage device of claim 13 wherein the method further comprises:

replacing the signing key in the binding record of the secure anchor point device with the new signing key used to generate the new signature.

17. An apparatus comprising:

a secure anchor point device in a digital rights management system, the secure anchor point device including:

an unique and hard-to-falsify circuit;

a signing module that generates a signature based on a signing key in response to receiving a rights object from a content provider, the rights object defining one or more rights for using an encrypted digital property instance, wherein the signature is transmitted from the secure anchor point device to the content provider;

an authentication module that receives a signed rights object from a digital rights management module, the signed rights object including the rights object and the signature, receives a title pre-key when use of the encrypted digital property is in accordance with the one or more rights defined in the signed rights object, and verifies the signed rights object using the signing key.

18. The apparatus of claim 17 further comprising:

data storage coupled to the signing module and the authentication module that securely stores the signing key, wherein the authentication module receives the signed rights object and a modified rights object and verifies the signed rights object using the signing key and the signing module generates a new signature based on a new signing key and the modified rights object, the data storage replacing the securely stored signing key with the new signing key.

\* \* \* \* \*